United States Patent [19]

Mollard

[11] 4,211,759

[45] Jul. 8, 1980

[54] HIGH-DENSITY SODIUM PERBORATE AND METHOD OF PREPARATION

[75] Inventor: Paul Mollard, Sainte-Foy-les-Lyon, France

[73] Assignee: Produits Chimiques Ugine Kuhlmann, Paris, France

[21] Appl. No.: 19,614

[22] Filed: Mar. 12, 1979

Related U.S. Application Data

[63] Continuation of Ser. No. 852,750, Nov. 18, 1977, abandoned, which is a continuation of Ser. No. 678,205, Apr. 19, 1976, abandoned, which is a continuation of Ser. No. 468,878, May 10, 1974, abandoned, which is a continuation-in-part of Ser. No. 217,039, Jan. 11, 1972, abandoned.

[30] Foreign Application Priority Data

Jan. 13, 1971 [FR] France .............................. 71.00900

[51] Int. Cl.$^2$ .............................................. C01B 15/12
[52] U.S. Cl. .................................... 423/281; 423/266; 423/274
[58] Field of Search ................................ 423/279–281, 423/268, 266, 274; 252/321, 358; 23/300, 302; 210/24

[56] References Cited

U.S. PATENT DOCUMENTS

| | | | |
|---|---|---|---|
| 2,390,212 | 12/1945 | Fritz | 252/358 |
| 2,923,687 | 2/1960 | Jurisch | 252/321 |
| 2,969,332 | 1/1961 | Lawler | 252/321 |
| 3,109,706 | 11/1963 | Leblon et al. | 423/281 |
| 3,131,995 | 5/1964 | Gonze et al. | 423/281 |
| 3,433,582 | 3/1969 | Campbell | 423/281 |
| 3,531,463 | 9/1970 | Gustafson | 210/24 R |
| 3,653,848 | 8/1972 | Port et al. | 23/302 |
| 3,751,373 | 8/1973 | Lieberman | 252/321 |
| 3,770,930 | 11/1973 | Teot | 423/268 |

FOREIGN PATENT DOCUMENTS 679877 9/1952 United Kingdom .................... 423/281

OTHER PUBLICATIONS

Kirk et al. *Encyclopedia of Chemical Technology*, 2nd Edition Interscience, N. Y. vol. 19 pp. 511, 515–517, 520–524, 526.

*Primary Examiner*—Brian E. Hearn
*Attorney, Agent, or Firm*—Pennie & Edmonds

[57] ABSTRACT

A sodium perborate ($NaBO_2$, $H_2O_2$, $3H_2O$) product having approximately spherical particles of size between about 250 and 600 microns, a bulk density between about 0.75 and 1.05 Kg./liter and a superior resistance to abrasion and impact, is prepared by a method comprising crystallization from a supersaturated aqueous solution of sodium perborate in the presence of an anionic surfactant and in the absence of alkaline metal silicates.

18 Claims, 4 Drawing Figures

PHOTOMICROGRAPH OF GRANULES PREPARED ACCORDING TO THIS INVENTION.

APPARENT DENSITY 0.79 Kg./LITER
MAGNIFICATION = 50 x

SCANNING ELECTRON MICROGRAPH OF GRANULES
PREPARED ACCORDING TO THIS INVENTION.

APPARENT DENSITY 0.81 Kg./LITER
MAGNIFICATION = 510 x

PHOTOMICROGRAPH OF CONVENTIONAL COMMERCIAL GRANULES.

APPARENT DENSITY 0.55 Kg./LITER
MAGNIFICATION = 50 x

SCANNING ELECTRON MICROGRAPH OF GRANULES
PREPARED COMMERCIALLY BY CONVENTIONAL PROCEDURE.

APPARENT DENSITY 0.538 Kg./LITER
MAGNIFICATION = 557 x

HIGH-DENSITY SODIUM PERBORATE AND METHOD OF PREPARATION

This is a continuation of application Ser. No. 852,750, filed Nov. 18, 1977, which is a continuation of Ser. No. 678,205 filed Apr. 19, 1976, which is a continuation of Ser. No. 468,878, filed May 10, 1974, which is a continuation-in-part of application Ser. No. 217,039 filed Jan. 11, 1972, all now abandoned, all of which are hereby incorporated by reference.

BACKGROUND OF THE INVENTION

Various methods now in commercial use for the production of sodium perborate comprise its crystallization from a supersaturated aqueous solution. A high degree of supersaturation can be obtained by reacting a borate such as sodium metaborate, borax or the like with an oxidizing agent such as hydrogen peroxide or sodium peroxide, optionally in the presence of sodium hydroxide and/or a stabilizer such as magnesium silicate.

In practice, if precautions are not taken, the sodium perborate grains, granules or particles obtained will have a wide range in size, often including a large fraction of very fine particles which, when dry, constitute an extremely troublesome source of dust during handling such as in the preparation of powder mixtures. Furthermore, it has been difficult in practice to reproduce a particular range in particle size so that the regulation of powdered compositions prepared therefrom is problematical.

Present applicant has disclosed in French Pat. No. 1,187,352 a continuous process for the production of perborate grains which have a narrow range of size and which are free from dust. This process permits the preparation within a single apparatus and without further screening, of perborate granules falling within a narrow range of size, exemplarily between about 100 and 300 microns or between about 200 and 500 microns, and also having apparent or bulk densities which are relatively high, exemplarily up to about 0.65 Kg./liter. However, to the best knowledge of the applicant no method has been disclosed whereby a corresponding product can be made with substantially higher bulk density, exemplarily in the range of about 0.75 and 1.05 Kg./liter, also being resistant to impact and abrasion.

Subsequent experimental work has been directed to obtaining sodium perborate grains having a very low apparent density approaching that of other pulverulent substances with which the perborate is mixed in preparation of various powder mixtures—the purpose being to avoid a separation of the respective ingredients during different kinds of handling during use. The applicant has disclosed in French Pat. No. 1,436,629 a process for obtaining hollow grains of sodium perborate free from dust and having an apparent density falling in the range from about 0.38 to 0.45 Kg./liter. These grains are also rapidly dissolved in water.

Sodium perborate grains with low bulk density are obtained also according to French Pat. No. 1,229,652 whereby crystallization from highly supersaturated solutions at low temperatures and moderate agitation results in apparent densities between 0.25 and 0.50 Kg./liter. The Certificate of Addition No. 76,697 to this patent discloses the use of a wetting agent during crystallization to improve the speed with which the perborate grains subsequently dissolve in water; however, the apparent density of these grains is low, exemplarily 0.34–0.47 Kg./liter, within the range set forth in the parent patent.

The perborate grains of the above-described prior art, especially those with low apparent densities, are relatively fragile. Having poor resistance to abrasion and impact, they break down during commercial handling with the formation of undesirable dust. This is particularly objectionable when they are transported by such modern methods as by pneumatic conveyors or fluidized bed transportation. At the time of their use in compounding powdered products, in addition to the dust nuisance, their apparent density has been changed in unpredictable and variable manner. In effect, the disadvantages, which the various modifications in crystallization technique have attempted to overcome, have reappeared.

SUMMARY OF THE INVENTION

A method has now been found whereby grains of sodium perborate can be produced which are substantially improved in their ability to resist the forces of abrasion and impact during commercial handling. It has been discovered surprisingly that granules having this property are obtained when the crystallization from a supersaturated aqueous solution is carried out in the presence of certain anionic surfactants, stabilizers like magnesium silicate being absent. The granules in this improved product are approximately spherical in shape, have an apparent density in the range between about 0.75 and 1.05 Kg./liter, and a size falling in the range between 250 and 600 microns.

Briefly stated, the present invention comprises the method of crystallizing sodium perborate from a supersaturated aqueous solution of sodium perborate containing an anionic surfactant having at least one sulfate or sulfonate moiety attached to a hydrocarbon chain having 2 to 22 carbon atoms so long as the total number of carbon atoms or molecular weight is sufficient to impart surfactant properties to the compounds, alkaline metal silicates being absent.

The invention also comprises the unique product of its method, granules of sodium perborate, $NaBO_2,H_2O_2,3H_2O$, characterized by an approximately spherical shape, an apparent density between about 0.75 and 1.05 Kg./liter, a granule size between about 250 and 600 microns and a superior resistance to abrasion and impact.

The unique and novel shape of the sodium perborate granules of this invention is illustrated by comparing their photomicrographs in FIGS. 1 and 2 with the corresponding micrographs of a commercial perborate typical of conventional production in FIGS. 3 and 4. The conventional granule is a rough agglomeration of crystals which project outward at the surface in a manner making it easily vulnerable to fragmentation. The novel granule of the instant invention, to the contrary, is a compact, closely packed arrangement of the elementary crystals; the particle has a quasi-spherical shape and relatively smooth surface with a minimum of protruding crystals.

DETAILED DESCRIPTION

Figure 1:

In evaluating the mechanical strength of the sodium perborate granules reported in the examples of this disclosure, two standard tests have been used measuring the resistance respectively to abrasion and to grinding. Before and after each test, the sample of granules was passed through a series of screens of various grating sizes. In particular, the screens most frequently used corresponded to 417, 149 and 53 microns. The total weight of the particles which passed through a particular size screen was expressed as percentage based on the total weight of the sample before screening, and the increase Δ in this percentage after exposure to the test was taken as an estimate of the fragmentation effected by the test.

Thus, if $W_A$ and $W_B$ are the total weights of the sample screened respectively after and before the test, and $w_A$ and $w_B$ are the corresponding weights of the material passing, exemplarily through a 53-micron screen, then at 53 microns the difference $$\Delta = 100 w_A/W_A - 100 w_B/W_B$$

The standard abrasion test was carried out using a glass tube having 1,460 mm length and 27 mm interior diameter. The base of the tube was fitted to an inlet for nitrogen supplied from a gas cylinder. Gauges were provided to measure the pressure of nitrogen between the supply cylinder and the inlet and to measure the rate of nitrogen flow through the tube. The test sample 50 grams of sodium perborate granules was placed in the tube, the top of the tube was covered with a very fine screen and nitrogen was introduced into the tube at a pressure of 2 Kg. per cm$^2$ and at a flow rate of 500 liters/hour for a duration of five minutes.

The standard grinding test was carried out using a horizontal steel cylinder having interior dimensions of 110 mm diameter and 115 mm length. This cylinder was placed on a variable speed rotating apparatus. The sample to be tested, generally about 50 grams, was placed in the cylinder together with eight steel balls of 20 mm diameter and 33.5 gram weight. The cylinder was closed in an airtight manner and rotated for six minutes at a speed of about 15 r.p.m.

The anionic surfactants that can be used according to this invention include those containing at least one sulfate and/or sulfonate moiety attached to at least one hydrocarbon (alkyl) chain having 2-22 carbon atoms, any of which carbon atoms can be replaced by an oxygen (ether or ester) atom, i.e., the chain can be "heterolinear" containing a "hetero" oxygen atom. The compounds however, must have a total number of carbon atoms or of sufficient hydrophobicity to impart surface active properties to the compounds. Generally a total of about 8 carbon atoms is sufficient to impart surface-active properties to the compounds. Analogously the hetero-atom can be nitrogen, sulfur or phosphorus. The hydrocarbon or heterohydrocarbon chain can also have at least one unsaturated bond, such as inoleyl sulfate. The sulfate or sulfonate moiety can be at the end of the hydrocarbon or heterohydrocarbon chain, as in cetyl sulfonate or octadecyl sulfate, or the sulfate can be attached elsewhere in the chain, i.e., the sulfate or sulfonate can be a secondary moiety as when oleic acid or methyl or butyl oleate is sulfated or sulfonated at the double bond.

A particularly preferred surfactant for use in carrying out the instant invention is diamyl sulfosuccinate. This can be considered as a secondary sulfate of a heterochain having 14 carbon atoms and 4 oxygen atoms; or it can be considered alternatively as the sulfate of a 4-carbon hydrocarbon which also has two ester groups attached. An analogous composition is dioctyl sulfosuccinate. These compounds can be described as diesters of sulfates of a $C_2$–$C_{22}$ hydrocarbon chain.

The above recited $C_2$–$C_{22}$ or $C_8$–$C_{22}$ hydrocarbon chains can be substituted by at least one hydroxyl group or by at least one $C_1$–$C_4$ alkoxy group such as methoxy, ethoxy, isopropoxy, n-propoxy, n-butoxy, isobutyoxy and tertiary butoxy.

It is also advantageous to use, together with the sulfated surfactant, at least one non-sulfated ester of an acid, saturated or not, having 8–18 carbon atoms esterified with an alcohol possessing from 2 to 4 carbon atoms.

Various moieties which can be present in addition to the sulfate and/or sulfonate can either confer upon the main molecule certain useful properties such as, exemplarily, chemical stability during subsequent use or modified solubility.

The surfactant composition of this invention can also contain certain additives to confer anti-foaming properties.

Among the possible additives, those similar to and compatible with the main surfactant are preferred. These can be classified into two categories: (a) those which possess at least one sulfate and/or sulfonate group and one non-esterified carboxyl group and (b) those which do not have a sulfate or sulfonate group but which have at least one ester group, those being preferred which result from esterification of a carboxylic acid with a $C_1$–$C_8$ alcohol.

Acid sulfates like sulfated oleic acid are examples of category (a).

Non-sulfated esters like isobutyl oleate exemplify category (b).

The amount of additive of category (a) generally comprises from 5–25% by weight of the fundamental component and the amount of additive of category (b) generally comprises from 5–30% by weight of the fundamental component.

The sulfate, sulfonate and carboxylate surfactants can be introduced in the form of acids, or, preferably, they can be used as their soluble salts, such as preferably the sodium, potassium or ammonium salts.

It is possible in using the surfactants of the present invention, to apply with advantage a certain independence among the different properties of the resulting sodium perborate; it is for example possible to prepare a product having a bulk density with a relatively low value at the lower end of the range characterizing the product of the invention and/or with a granule size corresponding to the upper range characteristic of this invention, but nevertheless substantially more resistant to abrasion and impact than prior art products.

The surfactant or surfactants useful according to this invention are advantageously used at a total concentration corresponding to from about 0.3 to 0.7 grams per liter of mother liquor. When minor quantities of compounds possessing alcohol moieties are used, these are advantageously at a level from about 0.003 to 0.2 grams per liter of mother liquor. Likewise a non-sulfated ester, when used together with a corresponding sulfated ester can be between about 0.01 and 0.06 grams per liter. In general, the effectiveness of the surfactant composition, when studied as a function of concentration, passes through a maximum, and there is no advantage to employing the surfactants in large quantities.

The applicant has observed repeatedly that the surfactant composition when used according to this invention is largely fixed on the crystals of sodium perborate, at least about 85%, and sometimes all, of the applied amount being deposited on the granules, and removed with them from the mother liquor. It has therefore been found possible to recycle the mother liquor without first removing the remaining surfactant contained therein.

When it is necessary to remove residual quantities of surfactant from the mother liquor before recycling, this can be done by passing the liquor over a selected resin, using well-known techniques of percolation through a column or agitation in a vessel. As examples of resins which are particularly advantageous, there can be mentioned the resins of the polystyrene type havng high macroreticular porosity and selectivity for the resins supplied by Rohm and Haas as XAD2 or XAD4 which resins are copolymers of styrene-divnyl benzene without active groups, or the resins sold by I.M.A.C.T.I. under the proprietary name ASMIT, for example ASMIT No. 173 or ASMIT No. 261 which resins are aromatic polyamine based resins possessing an active group $R-N(CH_3)_3OH$. Activated carbons can also be used.

The method of this invention can be used in continuous or so-called batch type crystallization processes. The surfactants additives can be introduced into the supersaturated solution all at once or continuously, before introducing the solution into the crystallizer or in the crystallizer itself.

The preparation of the supersaturated solutions of sodium perborate and the crystallization procedures used according to this invention, are the same as those previously known and used.

The invention is further illustrated, but not limited by the following examples of the practice of it, wherein and elsewhere herein unless stated otherwise the quantities are expressed in parts by weight.

In calculating the $\Delta$ values reported in these examples, the values for $100W_a/W_a$ and $100W_b/W_b$ were plotted on a graph as a function of the logarithm of the granule size in microns, and the values for $\Delta$ were read off the curve.

EXAMPLE 1

This example is not an illustration of the instant invention, but illustrates by way of comparison, a batch crystallization carried out in the absence of the additives of this invenion.

Into a vessel having a volume of one cubic meter and equipped with slow agitation, there was charged 200 liters of mother liquor recycled from a preceding operation and, as a seed, 20 Kg of sodium perborate having a particle size 53–105 microns. There was introduced thereto continuously and simultaneously over a period of 2 hours, 115 liters of a 35% by weight aqueous solution of hydrogen peroxide and 405 liters of a 240 gm/liter solution of sodium metaborate. The temperature was maintained at 20° C. At the cpmpletion of addition, the suspension was separated and the slurry of crystallized granules was dried. A 22 Kg yield of granules having the formula $NaBO_2.H_2O_2.3H_2O$ was obtained having the following characteristics:
Average granule size—250 microns
Range of 80% of granules—230–420 microns
Apparent density—0.60 Kg/liter
  Results of standard abrasion test
  Increase $\Delta$ in weight of screened material
<417 microns—0%
<149 microns—14%
<53 microns—8%
  Standard grinding test $\Delta$
417 microns—0%
149 microns—27%
53 microns—8.5%

Whereas this example and also Example 6 illustrate, for the sake of comparison prior-art procedures, the remaining examples, namely 2 through 5 and 7 through 13 are examples of the practice of the instant invention.

EXAMPLE 2

This example illustrates a batch crystallization carried out in a manner similar to Example 1 except that a surface active composition according to the present invention was included, namely the butyl ester of ricinoleic acid sulfate.

Example 1 was repeated except that over the same period of time for adding the hydrogen peroxide and sodium metaborate, 7 liters of a 26 gm/liter aqueous solution of the butyl ester of ricinoleic acid sulfate and 3 gm/liter ethanol were simultaneously added.

After extraction and drying as in Example 1, 220 Kg. of sodium perborate grains having the following characteristics were obtained:
Average granule size—400 microns
Range of 80% of granules—300–600 microns
Apparent density—0.740 Kg/liter
  Standard Abrasion Test
  Increase $\Delta$ in weight of screened material
417 microns—13%
149 microns—10%
53 microns—4.6%
  Standard grinding test
  Increase $\Delta$ in weight of screened material
417 microns—29%
149 microns—8%
53 microns—6.5%

Figure 2:
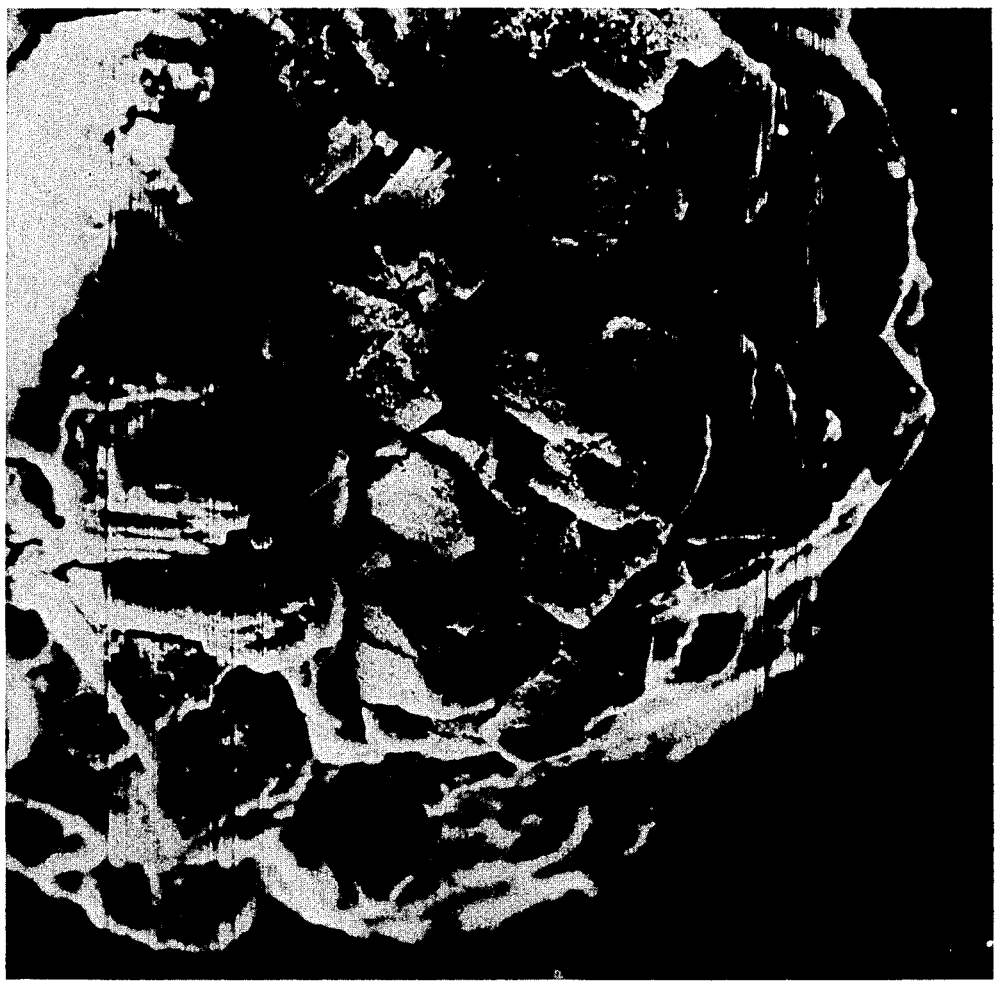
Figure 3:
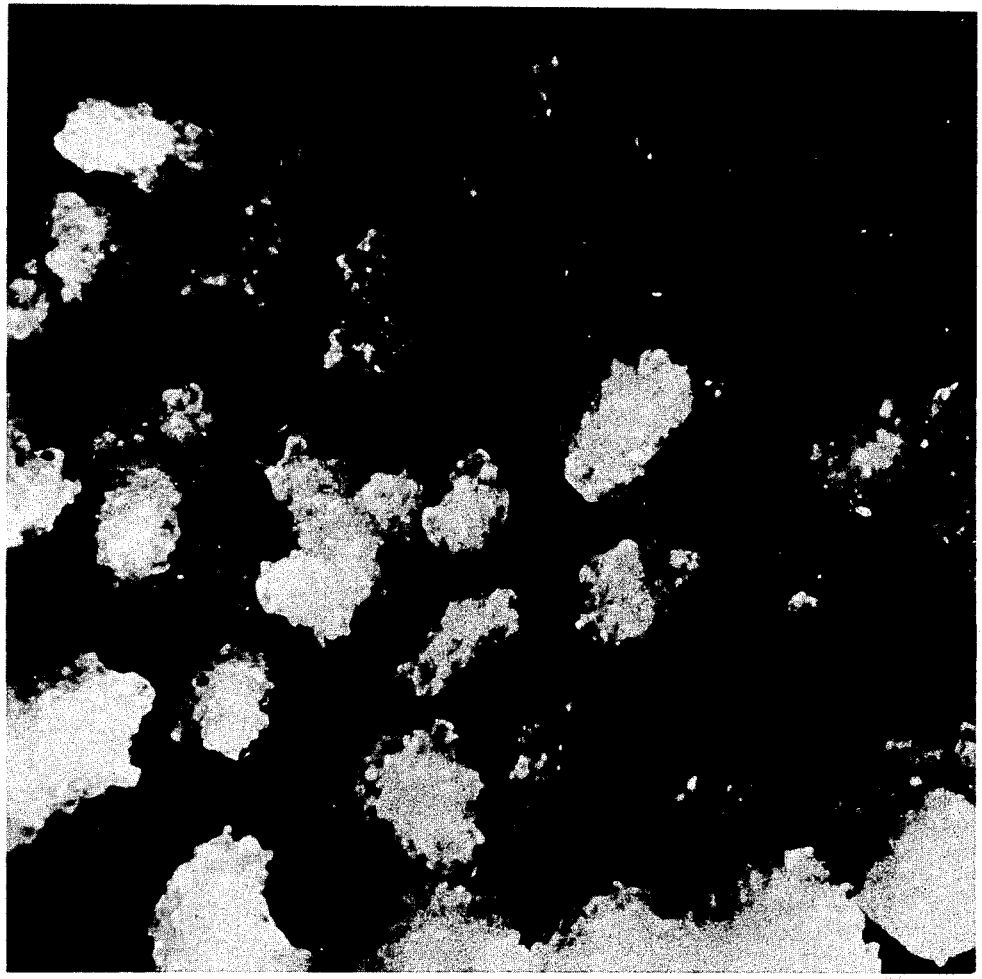
Figure 4:

The agglomerates had a quasi-spherical shape of the type shown in FIGS. 1 and 2.

It is noted that the addition of a surface active agent as defined herein increases the apparent density from 0.60 Kg./liter to 0.740 Kg./liter.

EXAMPLE 3

Example 2 was repeated except that instead of the 7 liters of additives, 13 liters of a 23 gm/liter solution of the isopropyl ester of ricinoleic acid sulfate, 0.4 gm/liter of the butyl ester of ricinoleic acid sulfate and 0.5 gm/liter of isopropanol were added.

The grains obtained had the following characteristics:
Average granule size—380 microns
Range of 80% of granules—290–600 microns
Apparent density—0.810 Kg./liter
  Standard Abrasion Test
  Increase $\Delta$ in weight of screened material
417 microns—2%
149 microns—8%
53 microns—4%
  Standard Grinding Test
  Increase $\Delta$ in weight of screened material
417 microns—7%
149 microns—11%
53 microns—6%

The grains had a shape similar to that shown in FIGS. 1 and 2.

EXAMPLE 4

This example illustrates a recycle operation using the mother liquors from a previous operation which mother liquors, however, were not purified. The same additives as in Example 3 were employed.

At the end of the first crystallization operation, ⅔ of the suspension was withdrawn and dried and the mother liquor thus obtained was used to prepare a new solution of sodium metaborate and for reacting a charge of borax with a solution of caustic soda having a concentration suitable for providing a solution of 240 gm/liter of metaborate.

A new charge of a solution sufficient to provide 200 Kg. of sodium perborate was introduced into the crystallizer still containing the ⅓ portion of the initial suspension. A new crystallization was carried out. Two-thirds of this suspension was extracted and dried yielding 182 Kg. of sodium perborate having the following characteristics:
Average particle size—300 microns
Apparent density—0.680 Kg./liter
  Standard Abrasion Test
  Increase Δ in weight of screened material
417 microns—2%
149 microns—24.5%
53 microns—7.6%

The new mother liquor was used as in the previous operations to prepare a new supersaturated solution in the crystallizer. The product obtained in this third operation had the following characteristics:
Average particle size—310 microns
Apparent density—0.610 Kg./liter
  Standard Abrasion Test
  Increase Δ in weight of screened material
417 microns—2%
149 microns—24%
53 microns—8.2%
  Standard Grinding Test
  Increase Δ in weight of screened material
417 microns—30%
149 microns—16%
53 microns—6%

EXAMPLE 5

This example illustrates successive batch operation using the additives of this invention but with purification of the mother liquors. The additives were the same as those employed in EXAMPLE 3 both in type and quantity.

The mother liquors were purified by passage through a column containing resin XAD2 of Rohm & Haas, Inc. and was used to prepare a new solution of sodium metaborate. The product resulting from this new operation had the following characteristics:
Average granule size—410 microns
Size range of 80% of granules—340-600 microns
Apparent density—0.810 Kg/liter
  Standard abrasion test
  Increase Δ in weight of screened material
417 microns—4.4%
149 microns—2.9%
53 microns—2.2%
  Standard grinding test
  Increase Δ in weight of screened material
417 microns—27%
149 microns—13%
53 microns—4.7%

Another operation carried out in the same manner as the previous ones resulted in a product having the following characteristics:
Average granule size—380-440 microns
Apparent density—between 0.77 and 0.83 Kg/liter
  Standard abrasion test
  Increase Δ in weight of screened material
417 microns—1-4%
149 microns—3-8%
53 microns—2.4-4%
  Standard grinding test
  Increase Δ in weight of screened material
417 microns—15-22%
149 microns—10-12%
53 microns—3-5.5%

EXAMPLE 6

This example is not an illustration of the instant invention but illustrates a continuous crystallization without benefit of the additives according to this invention.

The crystallizer was a cylindroconic apparatus of 3 meters diameter and 35 m$^3$ volume.

The liquid which was introduced at the base rose slowly in the apparatus and the upper portion thereof was eliminated.

The solid slowly settled counter current to the liquid. The heaviest granules were withdrawn at the bottom of the apparatus as they formed.

The quantities of components introduced at the base of the apparatus were as follows: 1,190 tons/hour of sodium metaborate in the form of a solution containing 350 mg./liter and 0.590 tons/hour of hydrogen peroxide in the form of a 70% by weight solution. The quantity of perborate produced and recovered at the base of the apparatus was 2.6 tons/hour.

The granules thus withdrawn had the following characteristics:
Average granule size—390 microns
Size range of 80% of granules—315-600 microns
Apparent density—0.620 Kg./liter
  Standard abrasion test
  Increase Δ in weight of screened material
417 microns—21.8%
149 microns—11%
53 microns—8.6%
  Standard grinding test
  Increase Δ in weight of screened material
417 microns—36%
149 microns—12%
53 microns—6.7%

EXAMPLE 7

Example 6 was again carried out except that 20 liters/hour of an aqueous solution containing the following was simultaneously employed:
Butyl ester of ricinoleic acid sulfate—75 g/liter
Isopropyl ester of ricinoleic acid sulfate—65 g/liter
Ethyl ester of stearic acid—5 g/liter
Butanol—1 g/liter In operation, the mother liquors obtained from the top of the apparatus and the mother liquors obtained after the drying operation which were passed over a resin of the type ASMIT 261 of I.M.A.CT.I. were recycled for reacting with borax in the presence of caustic soda.

After reaching steady-state operation, the granules which resulted had the following characteristics:
Average granule size—400 microns
Size range of 80% of granules—320-600 microns
Apparent density—0.810 Kg/liter
  Standard abrasion test
  Increase Δ in weight of screened material 417 microns—6%
149 microns—2.6%
53 microns—2%
  Standard grinding test
  Increase Δ in weight of screened material
417 microns—14.5%
149 microns—10%
53 microns—4.5%

The granules had a quasi-cylindrical shape similar to that shown in FIGS. 1 and 2.

EXAMPLE 8

(i) Into a vessel haing a volume of one cubic meter and equipped with slow agitation, there is charged initially 200 liters of recycled mother liquor from a preceding operation and —as a seed—10 Kg. of sodium perborate having a granule size 53-105 microns. There is introduced thereto continuously and simultaneously over a period of 90 minutes, 115 liters of 35 weight percent aqueous hydrogen peroxide, 405 liters of an aqueous solution containing 240 g/liters of sodium metaborate and a solution, in 10 liters of water, of 37 g/liters of the sodium salt of octadecyl sulfate having the formula

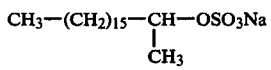

Temperature is maintained at 20° C. At the completion of addition, the agitation is continued for 5 more minutes, the suspension is centrifuged and the product is dried. A 210 Kg. yield of sodium perborate $NaBO_2, H_2O_2, 3H_2O$ is obtained having the following characteristics:
Average granule size—530 microns
  Apparent density—0.898 Kg./liter
  Results of Standard Abrasion Test
  Increase Δ in weight of screened material
Less than 417 microns—0.3%
149 microns—5.9%
53 microns—1.9%

(ii) The procedure of part (i) of this example is repeated except that the quantity of octadecyl sulfate used is doubled. The product obtained has the following characteristics:
Average granule size—600 microns
Apparent density—1.019 Kg./liter
  Results of Standard Abrasion Test
  Increase Δ in weight of screened material
<417 microns—0.1%
<149 microns—1.5%
<53 microns—0.7%

In both operations (i) and (ii), the octadecyl sulfate is completely fixed on to the perborate and can no longer be detected in the final mother liquor, using the volumetric test for determination of anionic sulfactants according to the Method CIA 2.70 E adopted in 1970 by the Commission Internationale d/analyse, 70 Champs Elysees, Paris 8 ème.

EXAMPLE 9

(i) The procedure described in Example 8 is followed except that a double amount, namely 20 Kg. of sodium perborate seed is used and the octadecyl sulfate is replaced by a mixture of additives consisting of equal quantities, by weight, of the sulfates of the isobutyl esters of oleic and linoleic acids containing in addition the unsulfated isobutyl esters of each of these acids, the amounts being used per 10 liters of water being 107 grams of the sulfated isobutyl ester of oleic acid, 107 grams of the sulfated isobutyl ester of linoleic acid, 45 grams of the unsulfated isobutyl ester of oleic acid and 45 grams of the unsulfated isobutyl ester of linoleic acid.

The perborate obtained at the end of the continuous operation weighs 218 Kg. and possesses the following characteristics:
Average granule size—380 microns
Apparent density—0.870 Kg./liter
  Results of Standard Abrasion Test
  Increase Δ in weight of screened material
<417 microns—1.5%
<149 microns—3.4%
<53 microns—2.7%

(ii) The operation of part (i) of this example 9 is repeated using the same quantities of the additives except that the initial addition of a crystallized perborate seed is omitted. The final perborate product weighs 197.8 Kg. and has the following likewise improved properties:
Average granule size—390 microns
Apparent density—0.890 Kg./liter
  Results of Standard Abrasion Test
  Increase Δ in weight of screened material
<417 microns—1.3%
<149 microns—1.9%
<53 microns—1.9%

The major portion of the additives are found in the perborate granules, being 82% and 78% respectively in operations (i) and (ii).

EXAMPLE 10

The operation of Example 9, part (ii) is repeated except that the sulfated isobutyl oleate is in the form of the sodium salt and the oleic acid starting material is commercial red oil. After the first appearance of perborate crystals, there is added 826 grams of a product containing 22% sulfated isobutyl oleate in the form of its sodium salt, 14.2% isobutyl oleate and 3.4% of sulfated sodium oleate dissolved in 10 liters of water.

The perborate obtained weighs 196.4 Kg. and has the following characteristics:
Average granule size—435 microns
Apparent density—0.846 Kg./liter
  Results of Standard Abrasion Test
  Increase Δ in weight of screened material
<417 microns—5.5%
<149 microns—2.6%
<53 microns—0.5%

80% of the additive material is found in the perborate and 20% remains in the mother liquor.

EXAMPLE 11

Using the same procedure as in Example 10 except that the additive used is 10 liters of an aqueous suspension containing 2% by weight of the sodium salts of sulfated alcohols having 16-19 carbon atoms, there is obtained 198.4 Kg. of a sodium perborate which retains 86% of the applied additive. 7% of the additive is found in the final mother liquor and 7% is degraded and not measurable by surface activity. The physical characteristics of the perborate are:
Average granule size—280 microns Apparent density—0.746 Kg./liter
  Results of Standard Abrasion Test
  Increase Δ in fraction of screened material <417 microns—4%
<149 microns—8.9%
<53 microns—3.0%

EXAMPLE 12

Using the same procedure as in Examples 10 and 11, the additive is changed to 100 grams of sodium dioctyl sulfosuccinate, a technical-grade product of 95% purity, again diluted in 10 liters of water. The product obtains is 197 Kg. of sodium perborate containing 64% of the applied surfactant. The characteristics are:
Average granule size—520 microns
Apparent density—0.794 Kg./liter
 Results of Standard Abrasion Test
 Increase Δ in fraction of screened material
<417 microns—2.4%
<149 microns—5.3%
<53 microns—1.9%

EXAMPLE 13

(i) An aqueous emulsion is prepared containing, by weight, 10% sodium salt of sulfated butyl oleate, 6.7% sodium salt of sulfated ethoxyethyl oleate and 6.3% butyl and ethoxyethyl oleates. A 750 gram quantity of this emulsion is diluted in 10 liters of water. A product is obtained consisting of 219 Kg. of sodium perborate having the following characteristics:
Average granule size—240 microns
Apparent density—0.860 Kg./liter
 Results of Standard Abrasion Test
 Increase Δ in fraction of screened material
<417 microns—0.9%
<149 microns—13.0%
<53 microns—5.4%
87% of the surfactant employed is found fixed on the perborate.

(ii) The operation is repeated with all conditions the same except that the aqueous emulsion used in preparing the additive contains, by weight, 9% of the sodium salt of sulfated butyl oleate, 6% of the sodium salt of sulfated ethoxyethyl oleate, 6.3% of butyl and ethoxyethyl oleates and 1.5% of the sodium salt of sulfated oleic acid.

There is obtained 200 Kg. of a sodium perborate whose characteristics are improved over those of the operation in Example 2 part (i):
Average granule size—350 microns
Apparent density—0.903 Kg./liter
 Results of Standard Abrasion Test
 Increase Δ in fraction of screened material
<417 microns—0.7%
<149 microns—6.6%
<53 microns—3.6%
86% of the surfactant was found to be fixed on the perborate.

I claim:

1. The method for preparing granules of sodium perborate $NaBO_2.H_2O_2.3H_2O$ characterized by approximately spherical shape having apparent density between about 0.74 and 0.83 Kg/liter, having an average granule size between about 380 and 440 microns and having superior resistance to abrasion and impact, wherein in the absence of stabilizers like alkaline metal silicates, the method comprises seeding an aqueous solution free from residual surfactants with sodium perborate, introducing into said aqueous solution (a) hydrogen peroxide, (b) sodium metaborate, and (c) a surface active anionic composition containing at least one sulfate and/or sulfonate group bonded to at least one hydrocarbon chain having 2 to 22 carbon atoms and of a sufficient hydrophobicity to impart surfactant properties to the composition and to cause the crystallization of the sodium perborate, and separating said granules from the aqueous solution to produce the granules of sodium perborate and the mother liquor.

2. The method of claim 1 in which the surfactant is added at substantially the same time as the hydrogen peroxide.

3. The method of claim 1 wherein said composition comprises an anionic surfactant having at least one sulfate or sulfonate moiety attached to a hydrocarbon chain havng 8 to 22 carbon atoms.

4. The method of claim 3 wherein said moiety is a secondary sulfate moiety.

5. The method of claim 3 wherein the hydrocarbon radical chain includes at least one non-carbon atom selected from the group consisting of oxygen, nitrogen, sulfur and phosphorus.

6. The method of claim 1 wherein said composition comprises an anionic surfactant having a sulfate or sulfonate attached to a $C_2$-$C_{22}$ hydrocarbon chain to which one or two ester groups are attached arising from esterification of a carboxyl group with a $C_1$-$C_8$ alcohol.

7. The method of claim 6 wherein said alcohol contains 3 to 6 carbon atoms.

8. The method of claim 3 wherein hydroxy or $C_1$-$C_4$ alkoxy groups are attached to said hydrocarbon chain.

9. The method of claim 3 wherein said composition comprises also (a) a substance having at least one sulfate and/or sulfonate group and an unesterified carboxyl group or (b) a substance containing no sulfate or sulfonate group and having at least one carboxylic group esterified by a $C_1$-$C_8$ alcohol.

10. The method of claim 3 wherein the hydrocarbon chain contains at least one unsaturated bond and at least one hetero oxygen atom.

11. The method of claim 3 wherein alcohol is added to the supersaturated solution.

12. The method of claim 3 wherein at least one non-sulfated ester resulting from the reaction of an acid containing 8 to 22 atoms of carbon with an alcohol containing 2 to 4 atoms of carbon is added to the supersaturated solution.

13. The method of claim 3 wherein the surface active composition is the butyl or isopropyl ester of ricinoleic acid sulfate.

14. The method of claim 3 wherein the surface active composition is employed at a level of about 0.3 to 0.7 g./liter of mother liquor present.

15. The method of claim 12 wherein the non-sulfated ester is employed at a level of from about 0.01 to 0.06 g./liter of mother liquor present.

16. A method of preparing granules of sodium perborate, $NaBO_2.H_2O_2.3H_2O$, characterized by approximately spherical shape, an apparent density between about 0.74 and 0.83 Kg/liter, an average granule size between about 380 and 440 microns and a superior resistance to abrasion and impact, which method comprises
 (a) preparing a supersaturated aqueous solution of sodium perborate $NaBO_2.H_2O_2.3H_2O$ without the presence of surfactants;
 (b) then adding to said supersaturated solution, an effective amount of a surface active anionic composition containing at least one sulfate and/or sulfonate group bonded to at least one hydrocarbon chain having 2 to 22 carbon atoms and sufficient hydrophobicity to impart surfactant properties thereto and causing crystallization of the sodium perborate granules in the presence of the anionic surfactant in the absence of stabilizers like alkaline metal silicates, and separating the granules from the water to recover the granules and mother liquor.

17. The method of claim 16 wherein the mother liquor is recycled for use in preparing a new supersaturated solution after said mother liquor has been contacted with a highly macroreticular porous polystyrene adsorbant resin selective to the surfactant.

18. The method of claim 16 wherein the mother liquor is recycled for use in preparing a new supersaturated solution after said mother liquor has been contacted with activated carbon.

* * * * *

UNITED STATES PATENT AND TRADEMARK OFFICE
CERTIFICATE OF CORRECTION

PATENT NO. : 4,211,759
DATED : July 8, 1980
INVENTOR(S) : Paul Mollard

It is certified that error appears in the above-identified patent and that said Letters Patent are hereby corrected as shown below:

Column 3, line 11, reads "W/A and W/A" should read -- $W/_A$ and $W/_B$ --.

Column 5, line 13 reads "divnyl" should read --divinyl--

Column 5, line 54 reads "cpmpletion" should read --completion--

Column 5, line 56 reads "22 Kg" should read --220 Kg--

Signed and Sealed this

Eleventh Day of November 1980

[SEAL]

Attest:

SIDNEY A. DIAMOND

Attesting Officer

Commissioner of Patents and Trademarks